United States Patent [19]

Suzuki

[11] Patent Number: 4,713,789

[45] Date of Patent: Dec. 15, 1987

[54] PROCESSOR AND METHOD OF PROCESSING IMAGE DATA

[75] Inventor: Kaoru Suzuki, Ootawara, Japan

[73] Assignee: Tokyo Shibaura Denki Kabushiki Kaisha, Kawasaki, Japan

[21] Appl. No.: 545,777

[22] Filed: Oct. 26, 1983

[30] Foreign Application Priority Data

Oct. 29, 1982 [JP] Japan .............................. 57-190432

[51] Int. Cl.[4] .......................... G06F 7/38; G06K 9/54; G06K 9/60
[52] U.S. Cl. ....................................... 364/724; 382/49
[58] Field of Search ................. 364/724, 200 MS File, 364/900 MS File, 414; 382/27, 41, 49; 340/750, 747

[56] References Cited

U.S. PATENT DOCUMENTS

| | | | |
|---|---|---|---|
| 3,200,380 | 8/1965 | MacDonald et al. | 364/200 |
| 3,706,071 | 12/1972 | Gray | 382/49 |
| 3,984,819 | 10/1976 | Anderson | 364/200 |
| 4,044,333 | 8/1977 | Auspurg et al. | 364/200 |
| 4,195,344 | 3/1980 | Yamazaki | 364/200 |
| 4,255,794 | 3/1981 | Nakayama | 364/724 |
| 4,373,191 | 2/1983 | Fette et al. | 364/724 |
| 4,375,081 | 2/1983 | Blesser | 364/724 |
| 4,408,228 | 10/1983 | Mahony | 358/112 |
| 4,467,444 | 8/1984 | Harmon, Jr. et al. | 364/736 |
| 4,493,047 | 1/1985 | Werst | 364/724 |
| 4,510,571 | 4/1985 | Dagostino et al. | 364/487 |

FOREIGN PATENT DOCUMENTS

2921123 5/1979 Fed. Rep. of Germany .
2086690 10/1981 United Kingdom .

OTHER PUBLICATIONS

Nicolae et al., "Multiprocessor System for the Real-Time Digital Processing of Video-Image Series", vol. 21 (1979) Aug. No. 4, pp. 171-183.
Mitsubishi Denki K.KK, "Picture Processing Device", vol. 6 No. 18 (P100) (896) Feb. 2, 1982, Abstract.
J. L. Basile et al., Systeme Multiprocesseur Adapte au Traitement d'images", pp. 142-151.

*Primary Examiner*—Gary V. Harkcom
*Assistant Examiner*—Dale M. Shaw
*Attorney, Agent, or Firm*—Cushman, Darby & Cushman

[57] ABSTRACT

To process X-ray transmission image data at a high speed, a processor comprises a memory section including at least first, second and third storage, the first storage storing the X-ray transmission image data in a digital form which is used for medical diagnosis, and the second and third storage storing temporarily and exclusively the processed image data. The processor also includes a processor control section including, at least first, second and third address generators each of which independently generates an address signal and applies the same to the corresponding storage respectively, processing circuit which receives the image data and image data which is temporarily stored in one of the second and third storage and processes both image data and applies the same for storage purposes to the remaining of the second and third storage. The processor also includes a central control circuit having control signal generator which simultaneously applies address control signals to the first, second and third address generators respectively, storage control signals to the first, second and third storage respectively, and a control signal to the processing circuit, whereby processing operations in the processing circuit is effected in parallel, and the resultant processed image data is temporarily stored in the remaining of the second and third storage under the control of the central control circuit.

6 Claims, 11 Drawing Figures

FIG. 5

| TIME / LATCH | $t_1$ | $t_2$ | $t_3$ | $t_4$ | $t_5$ | --- | $t_{M-1}$ | $t_M$ | $t_{M+1}$ | $t_{M+2}$ | $t_{M+3}$ | $t_{M+4}$ |
|---|---|---|---|---|---|---|---|---|---|---|---|---|
| 15C | | $F_{1,2}$ | | | | --- | | | | | | |
| 15D | $F_{1,1}$ | | | | | --- | | | | | | |
| 15E | | | | 0 | | --- | | | | | | |
| 15A | | | $G_{1,1}$ | $G_{1,2}$ | $G_{1,3}$ | --- | $G_{1,M-3}$ | $G_{1,M-2}$ | $G_{1,M-1}$ | $G_{2,1}$ | $G_{2,2}$ | $G_{2,3}$ |
| 15B | | | | $G_{1,1}$ | $G_{1,2}$ | --- | $G_{1,M-4}$ | $G_{1,M-3}$ | $G_{1,M-2}$ | $G_{1,M-1}$ | $G_{2,1}$ | $G_{2,2}$ |
| 15J | | | | | $r1_{1,1}$ | --- | $r1_{1,M-5}$ | $r1_{1,M-4}$ | $r1_{1,M-3}$ | $r1_{1,M-2}$ | ✕ | $r1_{2,1}$ |

| $t_{2M-2}$ | $t_{2M-1}$ | $t_{2M}$ | $t_{2M+1}$ | $t_{2M+2}$ | $t_{2M+3}$ | --- | $t_{(N-2)(M-1)}$ | $t_{(N-2)(M-1)+1}$ | $t_{(N-2)(M-1)+2}$ | $t_{(N-2)(M-1)+3}$ | END |
|---|---|---|---|---|---|---|---|---|---|---|---|
| | | | | | | --- | | | | | |
| | | | | | | --- | | | | | |
| | | | | | | --- | | | | | |
| $G_{2,M-3}$ | $G_{2,M-2}$ | $G_{2,M-1}$ | $G_{3,1}$ | $G_{3,2}$ | $G_{3,3}$ | --- | | $G_{N-2,M-3}$ | $G_{N-2,M-2}$ | $G_{N-2,M-1}$ | 0 |
| $G_{2,M-4}$ | $G_{2,M-3}$ | $G_{2,M-2}$ | $G_{2,M-1}$ | $G_{3,1}$ | $G_{3,2}$ | --- | | $G_{N-2,M-4}$ | $G_{N-2,M-3}$ | $G_{N-2,M-2}$ | $G_{N-2,M-1}$ |
| $r1_{2,M-5}$ | $r1_{2,M-4}$ | $r1_{2,M-3}$ | $r1_{2,M-2}$ | ✕ | $r1_{3,1}$ | --- | | $r1_{N-2,M-5}$ | $r1_{N-2,M-4}$ | $r1_{N-2,M-3}$ | |

FIG. 6

| TIME / LATCH | $t_1$ | $t_2$ | $t_3$ | $t_4$ | $t_5$ | — | $t_{M-1}$ | $t_M$ | $t_{M+1}$ | $t_{M+2}$ | $t_{M+3}$ | $t_{M+4}$ | — |
|---|---|---|---|---|---|---|---|---|---|---|---|---|---|
| 15C | | 0 | | | | — | | | | | | | |
| 15D | $F_{1,3}$ | | | | | — | | | | | | | |
| 15E | | | | $r1_{1,1}$ | $r1_{1,2}$ | — | $r1_{1,M-4}$ | $r1_{1,M-3}$ | $r1_{1,M-2}$ | 0 | $r1_{2,1}$ | $r1_{2,2}$ | |
| 15A | | | $G_{1,3}$ | $G_{1,4}$ | $G_{1,5}$ | — | $G_{1,M-1}$ | $G_{1,M}$ | 0 | $G_{2,3}$ | $G_{2,4}$ | $G_{2,5}$ | |
| 15B | | | | $G_{1,3}$ | $G_{1,4}$ | — | $G_{1,M-2}$ | $G_{1,M-1}$ | $G_{1,M}$ | 0 | $G_{2,3}$ | $G_{2,4}$ | |
| 15J | | | | | $r2_{1,1}$ | — | $r2_{1,M-5}$ | $r2_{1,M-4}$ | $r2_{1,M-3}$ | $r2_{1,M-2}$ | ✕ | $r2_{2,1}$ | |

| | $t_{2M-2}$ | $t_{2M-1}$ | $t_{2M}$ | $t_{2M+1}$ | $t_{2M+2}$ | $t_{2M+3}$ | — | $t_{(N-2)(M-1)}$ | $t_{(N-2)(M-1)+1}$ | $t_{(N-2)(M-1)+2}$ | $t_{(N-2)(M-1)+3}$ | END |
|---|---|---|---|---|---|---|---|---|---|---|---|---|
| | | $r1_{2,M-4}$ | $r1_{2,M-3}$ | $r1_{2,M-2}$ | 0 | $r1_{3,1}$ | $r1_{3,2}$ | — | $t_{(N-2)(M-1)}$ | $r1_{N-2,M-4}$ | $r1_{N-2,M-3}$ | $r1_{N-2,M-2}$ | 0 |
| | | $G_{2,M-1}$ | $G_{2,M}$ | 0 | $G_{3,3}$ | $G_{3,4}$ | $G_{3,5}$ | — | | $G_{N-2,M-1}$ | $G_{N-2,M}$ | 0 | 0 |
| | $G_{2,M-1}$ | $G_{2,M-1}$ | $G_{2,M}$ | 0 | $G_{3,3}$ | $G_{3,3}$ | $G_{3,4}$ | — | | $G_{N-2,M-2}$ | $G_{N-2,M-1}$ | $G_{N-2,M}$ | 0 |
| | $r2_{2,M-5}$ | $r2_{2,M-4}$ | $r2_{2,M-3}$ | $r2_{2,M-2}$ | ✕ | $r2_{3,1}$ | | — | | $r2_{N-2,M-5}$ | $r2_{N-2,M-4}$ | $r2_{N-2,M-3}$ | $r2_{N-2,M-2}$ |

FIG. 7

| TIME / LATCH | $t_1$ | $t_2$ | $t_3$ | $t_4$ | $t_5$ | --- | $t_{M-1}$ | $t_M$ | $t_{M+1}$ | $t_{M+2}$ | $t_{M+3}$ | $t_{M+4}$ | --- |
|---|---|---|---|---|---|---|---|---|---|---|---|---|---|
| 15C | | $F_{2,2}$ | | | | | | | | | | | |
| 15D | $F_{2,1}$ | | | | | | | | | | | | |
| 15E | | | | $r2_{1,1}$ | $r2_{1,2}$ | --- | $r2_{1,M-4}$ | $r2_{1,M-3}$ | $r2_{1,M-2}$ | 0 | $r2_{2,1}$ | $r2_{2,2}$ | |
| 15A | | | $G_{2,1}$ | $G_{2,2}$ | $G_{2,3}$ | | $G_{2,M-3}$ | $G_{2,M-2}$ | $G_{2,M-1}$ | $G_{3,1}$ | $G_{3,2}$ | $G_{3,3}$ | |
| 15B | | | | $G_{2,1}$ | $G_{2,2}$ | | $G_{2,M-4}$ | $G_{2,M-3}$ | $G_{2,M-2}$ | $G_{2,M-1}$ | $G_{3,1}$ | $G_{3,2}$ | |
| 15J | | | | | $r3_{1,1}$ | | $r3_{1,M-5}$ | $r3_{1,M-4}$ | $r3_{1,M-3}$ | $r3_{1,M-2}$ | ⊠ | | |

| | $t_{2M-2}$ | $t_{2M-1}$ | $t_{2M}$ | $t_{2M+1}$ | $t_{2M+2}$ | $t_{2M+3}$ | --- | $t_{(N-2)(M-1)}$ | $t_{(N-2)(M-1)+1}$ | $t_{(N-2)(M-1)+2}$ | $t_{(N-2)(M-1)+3}$ | END |
|---|---|---|---|---|---|---|---|---|---|---|---|---|
| | --- | --- | --- | --- | --- | --- | | --- | --- | --- | --- | |
| | --- | --- | --- | --- | --- | --- | | --- | --- | --- | --- | |
| | $r2_{2,M-4}$ | $r2_{2,M-3}$ | $r2_{2,M-2}$ | 0 | $r2_{3,1}$ | $r2_{3,2}$ | | $r2_{N2,M-4}$ | $r2_{N2,M-3}$ | $r2_{N2,M-2}$ | 0 | |
| | $G_{3,M-3}$ | $G_{3,M-2}$ | $G_{3,M-1}$ | $G_{4,1}$ | $G_{4,2}$ | $G_{4,3}$ | | $G_{N-1,M-3}$ | $G_{N-1,M-2}$ | $G_{N-1,M-1}$ | 0 | |
| | $G_{3,M-4}$ | $G_{3,M-3}$ | $G_{3,M-2}$ | $G_{3,M-1}$ | $G_{4,1}$ | $G_{4,2}$ | | $G_{N-1,M-4}$ | $G_{N-1,M-3}$ | $G_{N-1,M-2}$ | $G_{N-1,M-1}$ | |
| | $r3_{2,M-5}$ | $r3_{2,M-4}$ | $r3_{2,M-3}$ | $r3_{2,M-2}$ | ⊠ | $r3_{3,1}$ | | $r3_{2,M-5}$ | $r3_{2,M-4}$ | $r3_{2,M-3}$ | $r3_{N-1,M-2}$ | |

| TIME / LATCH | t1 | t2 | t3 | t4 | t5 | — | tM-1 | tM | tM+1 | tM+2 | tM+3 | tM+4 |
|---|---|---|---|---|---|---|---|---|---|---|---|---|
| 15C | | F3,2 | | | | — | — | | | | | |
| 15D | F3,1 | | | | | — | — | | | | | |
| 15E | | | | r4,1,1 | r4,1,2 | — | r4,1,M-4 | r4,1,M-3 | r4,1,M-2 | ∅ | r4,2,1 | r4,2,2 |
| 15A | | | G3,1 | G3,2 | G3,3 | — | G3,M-3 | G3,M-2 | G3,M-1 | G4,1 | G4,2 | G4,3 |
| 15B | | | | G3,1 | G3,2 | — | G3,M-4 | G3,M-3 | G3,M-2 | G3,M-1 | G4,1 | G4,2 |
| 15J | | | | | r5,1,1 | — | r5,1,M-5 | r5,1,M-4 | r5,1,M-3 | r5,1,M-2 | ⨯ | r5,2,1 |

| | t2M-2 | t2M-1 | t2M | t2M+1 | t2M+2 | t2M+3 | — | t(N-2)(M-1) | t(N-2)(M-1)+1 | t(N-2)(M-1)+2 | t(N-2)(M-1)+3 | END |
|---|---|---|---|---|---|---|---|---|---|---|---|---|
| — | r4,2,M-4 | r4,2,M-3 | r4,2,M-2 | ∅ | r4,3,1 | r4,3,2 | — | — | r4,N-2,M-4 | r4,N-2,M-3 | r4,N-2,M-2 | ∅ |
| — | G4,M-3 | G4,M-2 | G4,M-1 | G5,1 | G5,2 | G5,3 | — | — | GN,M-3 | GN,M-2 | GN,M-1 | ∅ |
| — | G4,M-4 | G4,M-3 | G4,M-2 | G4,M-1 | G5,1 | G5,2 | — | — | GN,M-4 | GN,M-3 | GN,M-2 | GN,M-1 |
| — | r5,2,M-5 | r5,2,M-4 | r5,2,M-3 | r5,2,M-2 | ⨯ | r5,3,1 | — | — | r5,N-2,M-5 | r5,N-2,M-4 | r5,N-2,M-3 | r5,N-2,M-2 |

FIG. 10

| TIME LATCH | $t_1$ | $t_2$ | $t_3$ | $t_4$ | $t_5$ | — | $t_{M-1}$ | $t_M$ | $t_{M+1}$ | $t_{M+2}$ | $t_{M+3}$ | $t_{M+4}$ |
|---|---|---|---|---|---|---|---|---|---|---|---|---|
| 15C | | O | | | | | | | | | | |
| 15D | $F_{3,3}$ | | | | | | | | | | | |
| 15E | | | | $r_{5_1,1}$ | $r_{5_1,2}$ | — | $r_{5_1,M-4}$ | $r_{5_1,M-3}$ | $r_{5_1,M-2}$ | 0 | $r_{5_2,1}$ | $r_{5_2,2}$ |
| 15A | | | $G_{3,3}$ | $G_{3,4}$ | $G_{3,5}$ | — | $G_{3,M-1}$ | $G_{3,M}$ | 0 | $G_{4,3}$ | $G_{4,4}$ | $G_{4,5}$ |
| 15B | | | | $G_{3,3}$ | $G_{3,4}$ | — | $G_{3,M-2}$ | $G_{3,M-1}$ | $G_{3,M}$ | 0 | $G_{4,3}$ | $G_{4,4}$ |
| 15J | | | | | $r_{6_1,1}$ | — | $r_{6_1,M-5}$ | $r_{6_1,M-4}$ | $r_{6_1,M-3}$ | $r_{6_1,M-2}$ | ☒ | $r_{6_2,1}$ |

| | $t_{2M-2}$ | $t_{2M-1}$ | $t_{2M}$ | $t_{2M+1}$ | $t_{2M+2}$ | $t_{2M+3}$ | — | $t_{(N-2)(M-1)}$ | $t_{(N-2)(M-1)+1}$ | $t_{(N-2)(M-1)+2}$ | $t_{(N-2)(M-1)+3}$ | END |
|---|---|---|---|---|---|---|---|---|---|---|---|---|
| | — | — | — | — | — | — | — | — | — | — | — | — |
| | — | — | — | — | — | — | — | — | — | — | — | — |
| | $r_{5_2,M-4}$ | $r_{5_2,M-3}$ | $r_{5_2,M-2}$ | 0 | $r_{5_3,1}$ | $r_{5_3,2}$ | — | $r_{5_{N-2},M-4}$ | $r_{5_{N-2},M-3}$ | $r_{5_{N-2},M-2}$ | 0 | 0 |
| | $G_{4,M-1}$ | $G_{4,M}$ | 0 | $G_{5,3}$ | $G_{5,4}$ | $G_{5,5}$ | — | $G_{N,M-1}$ | $G_{N,M}$ | 0 | $G_{N,M}$ | 0 |
| | $G_{4,M-2}$ | $G_{4,M-1}$ | $G_{4,M}$ | 0 | $G_{5,3}$ | $G_{5,4}$ | — | $G_{N,M-2}$ | $G_{N,M-1}$ | $G_{N,M}$ | $G_{N,M}$ | 0 |
| | $r_{6_2,M-5}$ | $r_{6_2,M-4}$ | $r_{6_2,M-3}$ | $r_{6_2,M-2}$ | ☒ | $r_{6_3,1}$ | — | $r_{6_{N-2},M-5}$ | $r_{6_{N-2},M-4}$ | $r_{6_{N-2},M-3}$ | $r_{6_{N-2},M-2}$ | |

PROCESSOR AND METHOD OF PROCESSING IMAGE DATA

BACKGROUND OF THE INVENTION

The present invention relates to a processor for processing image data, e.g., X-ray transmission image data, at a high speed, and a processing method therefor.

Conventionally, in order to process image data by a microprocessor or the like, an arithmetic circuit having a single address bus and a single data bus is arranged to perform a sequence of operations concerning address calculations for a plurality of input data (i.e., output data read out from a plurality of memories), calculations between data, address calculations of output data for a plurality of output data, and data outputs. As a result, the processing speed is decreased, resulting in inconvenience.

The present invention has been made in consideration of the above situation, and has for its object to provide a processor and a processing method therefor so as to perform high-speed processing of image data.

SUMMARY OF THE INVENTION

The object described above may be accomplished by providing a processor comprising:

a memory section including at least first, second and third storage means, said first storage means storing original image data in a digital form which is used for medical diagnosis, and said second and third storage means storing temporarily and exclusively processed original image data; and a processor control section including;

at least first, second and third address generating means each of which independently generates an address signal and applies the same to said corresponding storage means respectively, processing circuit means which receives said original image data and image data which is temporarily stored in one of said second and third storage means and processes said both image data and applies the same for storage purposes to the remaining of said second and third storage means, and central control circuit means having control signal generating means which simultaneously applies address control signals to said first, second and third address generating means respectively, storage control signals to said first, second and third storage means respectively, and a control signal to said processing circuit means, whereby processing operations in said processing circuit means is effected in parallel, and the resultant processed image data is temporarily stored in the remaining of said second and third storage means under the control of said central control circuit means.

BRIEF DESCRIPTION OF THE DRAWINGS

The present invention will be best understood with reference to the accompanying drawings, in which:

FIGS. 5 through 10 are time charts for explaining operations of the filtering device shown in FIG. 2.

DETAILED DESCRIPTION OF THE PREFERRED EMBODIMENTS

Figure 1:
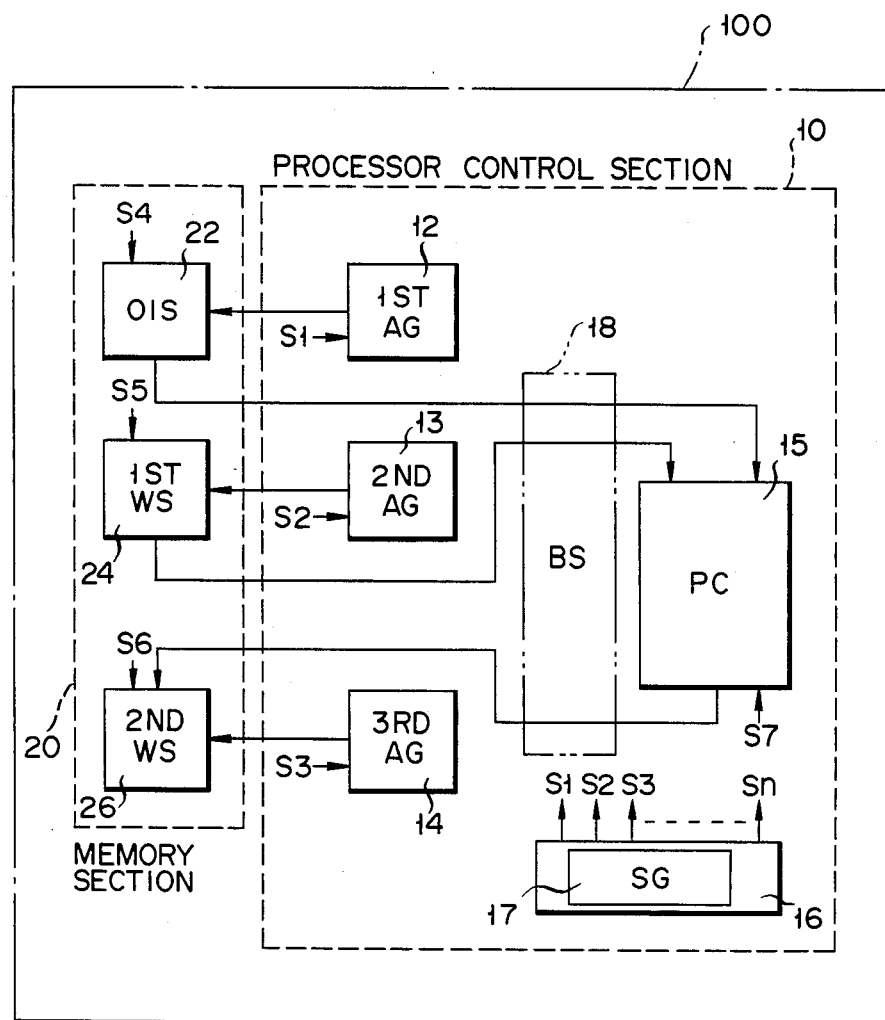
FIG. 1 shows a schematic diagram of a processor according to one preferred embodiment of the present invention.

FIG. 1 is a block diagram showing the basic configuration of a processor of the present invention.

A processor 100 has a processor control section 10 and a memory section 20. The memory section 20 has three storages 22, 24 and 26. The storage 22 stores original image data. The other storages 24 and 26 serve as first and second working or temporary storages, respectively.

Address generators 12, 13 and 14 for respectively accessing the storages 22, 24 and 26 are arranged in the processor control section 10. A processing circuit 15 is arranged in the processor control section 10. The processing circuit 15 receives output image data from the storage 22 and output data from the first working storage 24, and performs predetermined arithmetic operations. The calculation result is then supplied from the first working storage 24 to the second working storage 26. A central control circuit 16 is arranged in the processor control section 10. A control signal generator 17 for generating various control signals S1 to Sn is built into the central control circuit 16. These control signals are used to control respective circuits and devices of the processor (to be described later). A data bus line selector 18 is coupled between the storages 22, 24 and 26 and the processing circuit 15, as indicated by a two-dot-/dash line. The data bus line selector 18 is controlled to selectively store the calculation results in the first or second working storages 24 or 26. The storage data can be read out and is fetched by the processing circuit 15 for subsequent calculations.

According to this processor, the control signals S1 to S3 are simultaneously supplied from the control signal generator 17 to the address generators 12 to 14, respectively. Similarly, the memory control signals S4 to S6 are simultaneously supplied from the control signal generator 17 to the storages 22 to 26, respectively. The control signal S7 is also supplied from the control signal generator 17 to the processing circuit 15. In this manner, parallel processing can be performed to store the operation results in the second working storage 26. As a result, high-speed operation can be performed, as compared with the operation speed of the conventional processor.

More particularly, the address generators 12 to 14 are operated in parallel, thereby performing parallel processing as the main feature of the present invention. This will be described later.

Figure 2:
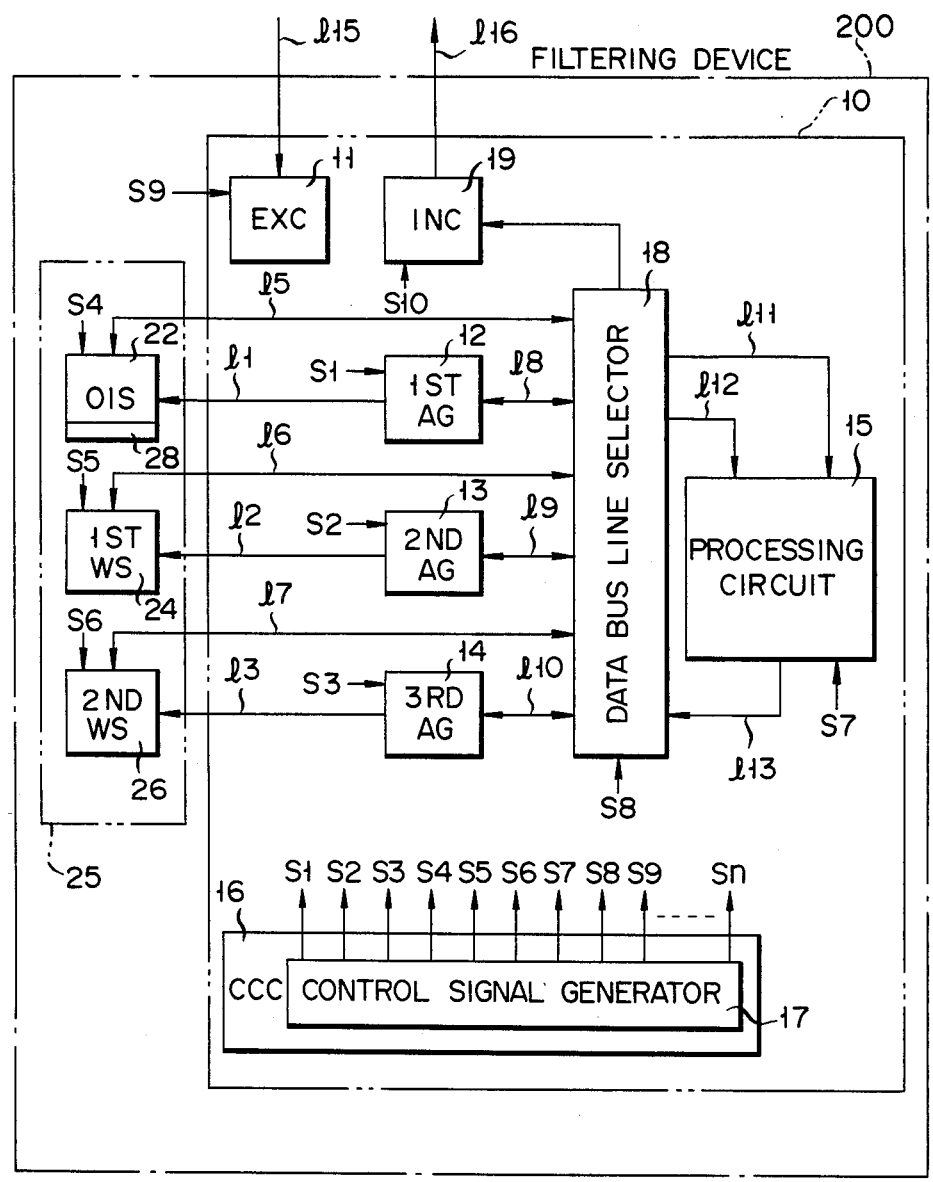
FIG. 2 shows a schematic diagram of a 3×3 filtering device into which the processor according to the present invention is introduced.

FIG. 2 shows a block diagram of a 3×3 filtering device in which the processor according to the present invention is incorporated. The reference numerals used in FIG. 1 denote the same circuit elements in FIG. 2. Reference numeral 200 denotes a filtering device which mainly comprises a processor control section 10, an original image data storage 22, and first and second working storages 24 and 26. The processor control section 10 comprises the first to third address generators 12 to 14, a processing circuit 15, a data bus line selector 18, an external controller 11, an internal controller 19, and the central control circuit (CCC) 16 having the control signal generator 17 therein. Address bus lines 11 to 13 are coupled between the address generator 12 and the storage 22, between the address generator 13 and the storage 24 and between the address generator 14 and the storage 26, respectively. The storages 22 to 26 are coupled to the data bus line selector 18 through data bus lines 15 to 17, respectively.

The external controller 11 controls the filtering device 200 in accordance with a control signal externally supplied through a control bus line 115. The internal controller 19 controls an external device (not shown) through a control bus line 116 in accordance with a control signal supplied from the control signal generator 17 through the data bus line selector 18. The address generators 12 to 14 are coupled to the data bus line selector 18 through control bus lines 18 to 110, respectively. The data bus line selector 18 is coupled to the processing circuit 15 through data bus lines 111 to 113. The data bus line selector 18 is controlled in accordance with a control signal from the control signal generator 17 in the central control circuit 16. The control signal generator 17 in the central control circuit 16 generates the control signals S1 to S3 for the address generators 12 to 14, the control signals S4 to S6 for the storages 22 to 26, the control signal S7 for the processing circuit 15, the control signal S8 for the data bus line selector 18, and the control signal S9 for the external controller 11.

A filter coefficient storage 28 is arranged in the original image data storage 22. A filter coefficient data F stored in the central control circuit 16 is given as expression (1) below:

$$F = \begin{bmatrix} F11 & F12 & F13 & 0 \\ F21 & F22 & F23 & 0 \\ F31 & F32 & F33 & 0 \end{bmatrix} \quad (1)$$

The filter coefficient data F is practically divided into three steps. The first step includes the first to third coefficients F11 to F13; the second step includes the fourth to sixth coefficients F21 to F23; and the third step includes the seventh to ninth coefficients F31 to F33. Two adjacent coefficients, or a combination of a coefficient adjacent to a filter coefficient 0 and the filter coefficient 0 is read out for processing in response to the address signal S10 from the first address generator 12 every time a coefficient calculation is performed. For example, coefficients F11 and F12 are processed in the first filtering operation; F13 and 0, in the second filtering operation; F21 and F22, in the third filtering operation; . . . ; and F33 and 0, in the ninth filtering operation, thus completing the filtering processing.

Figure 3:
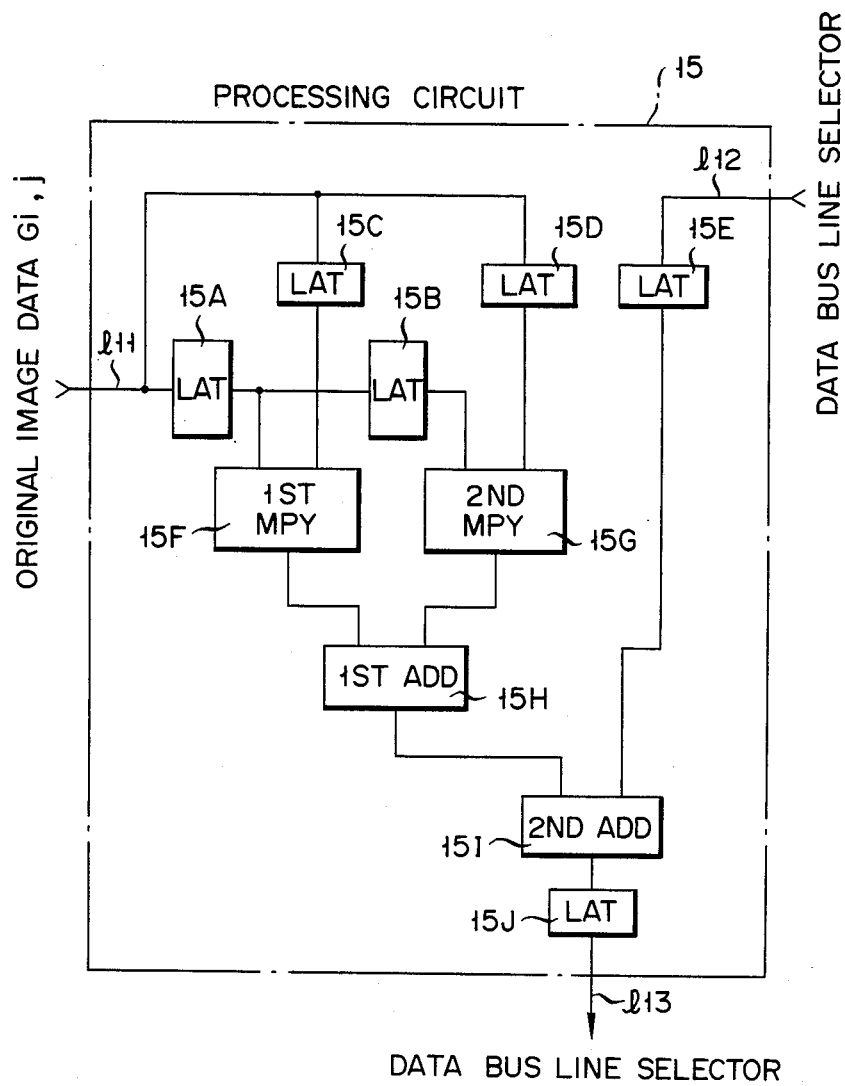
FIG. 3 shows a detailed schematic diagram of the processing circuit shown in FIG. 2.

FIG. 3 shows a detailed schematic diagram of the processing circuit 15 shown in FIG. 2. The processing circuit 15 comprises: first and second original image data latches 15A and 15B for latching image data $G_{i,j}$ supplied through the data bus line 111; first and second coefficient data latches 15C and 15D for respectively latching the first and second filter coefficient data supplied through the data bus line 112 and the data bus line selector 18; a processed image data latch 15E for latching the processed image data supplied through the data bus line 112; a first multiplier 15F for multiplying an output from the first original image data latch 15A with an output from the first coefficient data latch 15C; a second multiplier 15G for multiplying an output from the second original image data latch 15B with an output from the second coefficient data latch 15D; a first adder 15H for adding outputs from the first and second multipliers 15F and 15G; a second adder 15I for adding outputs from the processed image data latch 15E and the first adder 15H; and an image data latch 15J for latching an image data sum.

Figure 4:
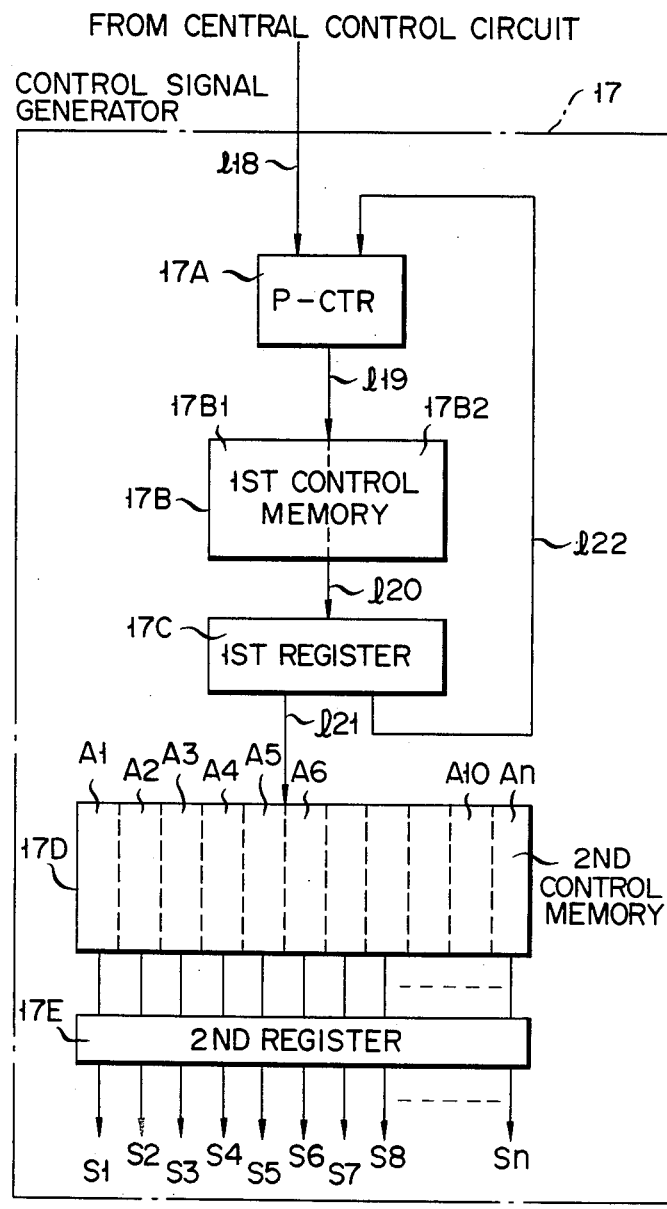
FIG. 4 shows a detailed schematic diagram of the control signal generator shown in FIG. 2.

FIG. 4 is a block diagram showing the internal configuration of the control signal generator 17. The control signal generator 17 comprises: a program counter 17A which is controlled through a control bus line 118 by the CCC 16; a first control memory 17B having an address area 17B₁ into which the address of the second control memory is stored and a sequence program area 17B₂; a first register 17C; a second control memory 17D for storing control data of various circuits which are controlled in response to an output from the first register 17C; and a second register 17E. Sequence data is fed back from the first register 17C to the program counter 17A through a bus line 122. The storage contents of the second control memory 17D include: control data of the first to third address generators 12 to 14 in memory areas A1 to A3; control data of the original image storage 22 in a memory area A4; control data of the first working storage 24 in a memory area A5; control data of the second working memory 26 in a memory area A6; control data of the processing circuit 15 in a memory area A7; control data of the data bus line selector 18 in a memory area A8; control data of the external controller 11 in a memory area A9; and control data of the filter coefficient data storage 28 in a memory area A10. These data are produced as the control signals S1 to S9 through the register 17E.

The operation of the control signal generator 17 described above will now be described.

In the control signal generator 17 shown in FIG. 4, the program counter 17A is operated in accordance with a control signal which is supplied from the CCC 16 through the control bus line 118 so as to access the first control memory 17B through a bus line 119. The address data and sequence program data of the second control memory 17D are separately stored in the first control memory 17B. The program and address signals which are required for filtering operation are selected in the control memory 17B in accordance with an output from the program counter 17A, and are supplied to the register 17C through a bus line 120. The sequence program data is then fed back to the program counter 17A and is used as timing data. The address data is supplied to the second control memory 17D through the first register 17C and is stored in a predetermined memory area of the second control memory 17D. The control signal of the control system which is stored in the second control memory 17D and is required for filtering operation is selected in units of memory areas and is read out therefrom. This control signal is supplied to each control system through the second register 17E.

The filtering device (FIG. 2) controlled in accordance with the output from the control signal generator 17 is operated as follows. The data data bus line selector 18 is activated in response to the control signal S8 so as to couple the data bus line l5 of the original image data storage 22 to the input data bus line l11 of the processing circuit 15, and the data bus line l6 of the first working memory 24 to the output data bus line l13 of the processing circuit 15. In this state, as described in connection to the expression (1), two filter coefficients data (e.g., F11 and F12) is sent along the coefficient data bus line l11, so that a filtering operation to be described with reference to the processing circuit 15 is performed for the entire area of the original image (i.e., one-frame image data). Thereafter, the image data after this first filtering operation are sequentially stored in the first working storage 24 through the data bus lines l13 and l6. The data bus line selector 18 is then operated to couple the input data bus line l12 of the processing circuit 15 and the data bus line l6 of the working storage 26. The output data bus line l13 of the processing circuit 15 is coupled to the data bus line l7 connected to the second working storage 26. In this state, the coefficients F13 and 0 are sequentially read out from the coefficient data storage 28 and are supplied through the data bus line l5 and the input data bus line l11 to the processing circuit 15, so that the processing circuit 15 performs a second filtering operation of the one-frame image data. At the same time, the image data (i.e., data obtained by the first filtering operation) in the first working storage 24 are stored in the second working storage 26 through the data bus lines l13 and l7. Thereafter, the data bus line selector 18 is operated to couple the data bus line l7 of the second working storage 26 to the input data bus line l12 of the processing circuit 15, so that the output data bus line l13 of the processing circuit 15 is coupled to the data bus line l6 connected to the first working storage 24. In this state, filter coefficients F21 and F22 are read out to perform a third filtering operation. The data obtained by the third filtering operation is added to the data of the first and second filtering operations which are read out from the second working storage 26. A sum is then stored in the first working storage 24. Data obtained by processing the subsequent filter coefficients F23, 0, F31, F32, F33 and 0 in units of two adjacent coefficients are alternately stored in the first and second working storages. This processing will be described in detail later.

The detailed operation of the processing circuit 15 will be described with reference to the block diagram in FIG. 3 and the timing charts in FIGS. 5 to 10.

In the processing circuit 15, the two filter coefficients F11 and F12 are sequentially latched by the coefficient data latches 15C and 15D, and original image data $G_{i,j}$ are sequentially latched by the original image data latches 15A and 15B at corresponding addresses. The operation of equation (2) below is performed by the multipliers 15F and 15G and the adders 15H and 15I so as to obtain the first calculation result $r1_{i,j}$. The first calculation result $r1_{i,j}$ is latched by the latch 15J and is then stored in the first working storage 24 in the manner previously described:

$$r1_{i,j}=(F11 \cdot G_{i,j})+(F12 \cdot G_{i,j+1}) \quad (2)$$

This calculation is performed for all the original image data $G_{i,j}$ (see FIG. 5). It is noted that in the following timing charts in FIGS. 5 through 10 "X" indicates "no signal is output" and "$\phi$" means "don't care".

The filter coefficients F13 and 0 are latched by the latches 15C and 15D, and the original image data $G_{i,j}$ are sequentially latched by the latches 15A and 15B at corresponding addresses. The first calculation data $r1_{i,j}$ stored in the first working storage 24 is latched by the latch 15E, and the calculation of equation (3) below (i.e., the second calculation) is performed, thereby obtaining a second calculation result. This result is latched by the latch 15J and is then stored in the second working storage 26.

$$r2_{i,j}=(F13 \cdot G_{i,j+2})+(0 \cdot G_{i,j+3})+r1_{i,j} \quad (3)$$

The above calculation is performed for all the original image data (i.e., one-frame image data) (see FIG. 6).

The filter coefficients F21 and F22 are sequentially latched by the latches 15C and 15D, and the original image data $G_{i,j}$ are latched by the latches 15A and 15B. The second calculation result $r2_{i,j}$ currently stored in the second working storage 26 is latched by the latch 15E, and the calculation of equation (4) below is performed, thus obtaining a third calculation result $r3_{i,j}$. This result is latched by the latch 15J and is then stored in the first working storage 24.

$$r3_{i,j}=(F21 \cdot G_{i+1,j})+(F22 \cdot G_{i+1,j+1})+r2_{i,j} \quad (4)$$

The above calculation is performed for all the original image data (see FIG. 7).

Subsequently, the filter coefficients F23 and 0 are latched by the latches 15C and 15D, and the original image data $G_{i,j}$ are latched by the latches 15A and 15B. The third calculation result $r3_{i,j}$ currently stored in the first working storage 24 is latched by the latch 15E, and the calculation of equation (5) below is performed, thereby obtaining a fourth calculation result. This result is latched by the latch 15J and is then stored in the second working storage 26.

$$r4_{i,j}=(F23 \cdot G_{i+1,j+2})+(0 \cdot G_{i+1,j+3})+r3_{i,j} \quad (5)$$

Figure 8:
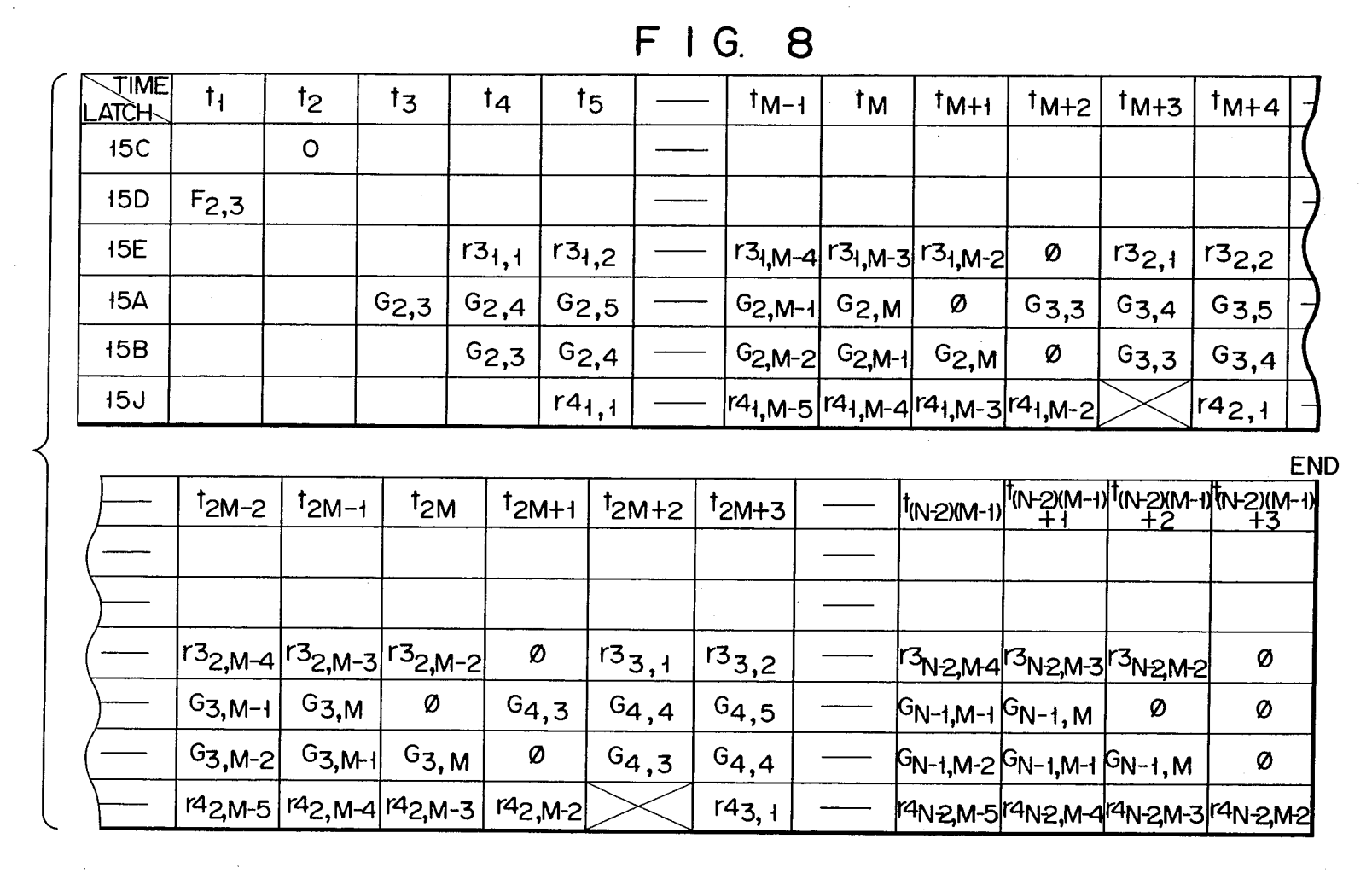

The above calculation is performed for all the original image data (see FIG. 8).

The filter coefficients F31 and F32 are latched by the latches 15C and 15D, and the original image data $G_{i,j}$ are latched by the latches 15A and 15B. The fourth calculation result $r4_{i,j}$ currently stored in the second working storage 26 is latched by the latch 15E, and the calculation of equation (6) below is performed, thereby obtaining a fifth calculation result. This result is latched by the latch 15J and is then stored in the first working storage 24.

$$r5_{i,j} = (F31 \cdot G_{i+2,j}) + (F32 \cdot G_{i+2,j+1}) + r4_{i,j} \qquad (6)$$

The above calculation is performed for all the original image data (see FIG. 9).

Finally, the filter coefficients F33 and 0 are latched by the latches 15C and 15D, and the original image data $G_{i,j}$ are latched by the latches 15A and 15B. The fifth calculation result $r5_{i,j}$ currently stored in the first working storage 24 is latched by the latch 15E, and the calculation of equation (7) below is performed, thereby obtaining a sixth calculation result. This result is latched by the latch 15J and is then stored in the second working storage 26.

$$r6_{i,j} = (F33 \cdot G_{i+2,j+2}) + (0 \cdot G_{i+2,j+3}) + r5_{i,j} \qquad (7)$$

The above calculation is performed for all the original image data (see FIG. 10).

As a result, equation (7) can be rewritten as equation (8) which provides processed data $R_{i,j}$ as follows:

$$\begin{aligned} R_{i,j} = &\ (F11 \cdot G_{i,j}) + (F12 \cdot G_{i,j+1}) + (F13 \cdot G_{i,j+2}) + \\ &\ (F21 \cdot G_{i+1,j}) + (F22 \cdot G_{i+1,j+1}) + \\ &\ (F23 \cdot G_{i+1,j+2}) + (F31 \cdot G_{i+2,j}) + \\ &\ (F32 \cdot G_{i+2,j+1}) + (F33 \cdot G_{i+2,j+2}) \end{aligned} \qquad (8)$$

The 3×3 filtering processing is thus completed.

Figure 11:
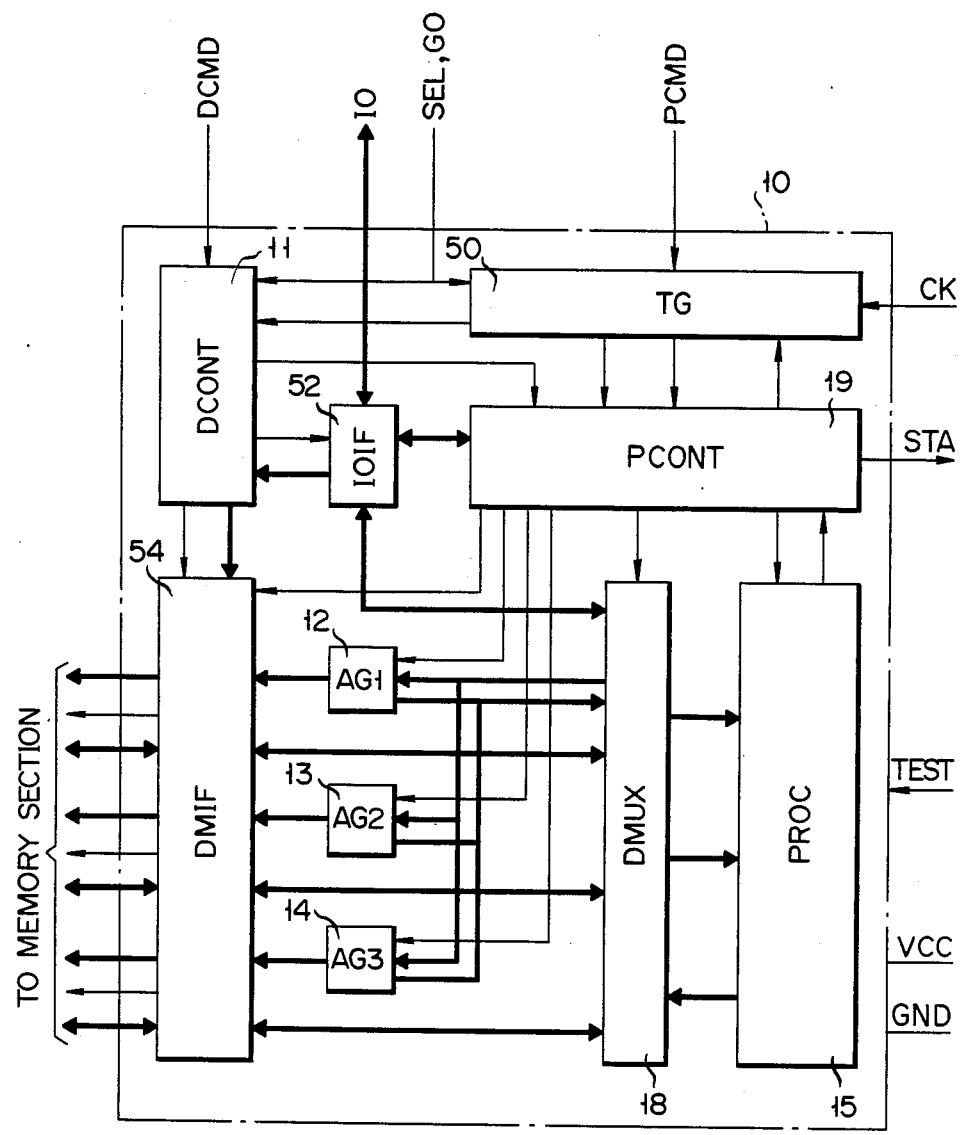
FIG. 11 shows a detailed schematic diagram of the processor control section according to another preferred embodiment of the present invention.

A modification of the processor control section 10 (FIG. 2) is shown in FIG. 11. A processor control section 10 shown in FIG. 11 comprises a one-chip IC. The circuit configuration of the processor control section 10 in FIG. 11 is substantially the same as that in FIG. 2, and will be briefly described hereinafter.

The processor control section 10 includes a timing generator (TG) 50. The timing generator 50 generates control signals in synchronism with an external clock signal CK. Some of the control signals are supplied to an internal controller 19, thereby supplying the timing signals to a processing circuit 15 and a data bus line selector 18.

The processor control section 10 also includes an input/output interface section 52 so as to couple an external controller 11, the internal controller 19 and the data bus line selector 18 to each other, so that the data signals processed by the processor control section 10 can be supplied to an external device (not shown) and can receive signals from the external device. The processor control section 10 further includes three address generators 12, 13 and 14 which are connected, through a memory interface section 54, to an original image data storage 22, working storages 24 and 26, and a filter coefficient storage 28.

While the invention has been described in terms of certain preferred embodiments, and exemplified with respect thereto, those skilled in the art will readily appreciate that various modifications, changes, omissions and substitutions may be made without departing from the spirit of the invention.

For example, a 3×3 filtering operation is exemplified in the above embodiments. However, the present invention may be applied to 5×5 or 7×7 filtering operations. Furthermore, the number of multipliers may be increased and the number of latches accordingly increased so as to perform parallel operations of adjacent coefficients, thereby further increasing the operation speed.

The following configuration can be provided as a modification of the control signal generator 17 shown in FIG. 4. This modified control signal generator has a function as a pipeline control section. The output terminal of the address area $17B_1$ of the first control memory 17B is connected to a plurality of delay circuits through a latch. These delay circuits are connected to the areas of the second control memory 17D. The output terminal of the sequence program area $17B_2$ of the first control memory 17B is connected to the program counter 17A through a command decoder, thereby forming a feedback path.

The delay of the signals from the circuit elements (e.g., address generators) in the pipeline operation can be absorbed, so that the number of program steps (control memory capacity) can be decreased.

What is claimed is:

1. An apparatus for performing a processing operation on image data, comprising:

memory means for storing data, including first, second and third storage means, said first storage means for storing first image data, said second storage means for storing second image data, and said third storage means for storing third image data;

processing circuit means, having at least two inputs and an output, for performing an arithmetic operation on data at said two inputs to produce processed image data at said output;

first, second and third data bus lines, said first data bus line coupled to said first storage means, said second data bus line coupled to said second storage means, and said third data bus line coupled to said third storage means;

data bus line selecting means, coupled to said first, second, and third data bus lines at opposite ends from said storage means, for selectively connecting each of said first, second and third data bus lines to one of said inputs and said output of said processing circuit means, respectively, in any order, so that any of said first, second, and third storage means can be connected to any of said inputs and output of said processing means;

first address generating means for generating an address for said first storage means so that said first image data is supplied from said first storage means to one of said inputs or from said output of said processing circuit means to said first storage means through said first data bus line;

second address generating means for generating an address for said second storage means so that said second image data is supplied from said second storage means to one of the inputs or from said output of said processing circuit means to said second storage means through said second data bus line; and third address generating means for defining addresses of said third storage means so that said third image data is supplied from said third storage means to one of said inputs or from said output of said processing circuit means to said third storage means through said third data bus line, said output of said processing circuit means being indicative of at least one of said addresses of said first, second and third address generating means based on a connecting mode of said data bus line selecting means.

2. Apparatus as in claim 1 wherein said memory means and said processing circuit means are simultaneously controlled.

3. An apparatus for filtering image data in digital form, comprising:
a memory section including:
(a) first storage means for storing said image data,
(b) second storage means for storing a plurality of filter coefficients, and
(c) third and fourth storage means, being of at least a same storage capacity as said first storage means, for temporarily storing processed image data;
processing circuit means having at least two inputs and an output for performing arithmetic operations on one of: (a) said image data stored in said first storage means, and (b) said processed image data stored in one of said third and fourth storage means, said arithmetic operation being performed using said filter coefficients which are stored in said second storage means;
first, second and third data bus lines, said first data bus line coupling said first and second storage means to said processing circuit means, said second data bus line coupling said third storage means to said processing circuit means, and said third data bus line connecting said fourth storage means to said processing circuit means;
data bus line selector means for selectively interchanging connection points to said processing circuit means of said first, second and third data bus lines, the possible connection points including said two inputs and said output of said processing circuit means;
first address generating means for accessing information including said image data stored in said first storage means and said filter coefficients stored in said second storage means to supply the accessed information to one of the inputs of said processing circuit means through said first data bus line as configured by said data bus line selector; and
second and third address generating means, one of said second and third addressing generating means accessing said processed image data stored in one of said third and fourth storage means to supplying said processed image data to the other of said inputs of said processing circuit, the other of said second and third addressing means defining addresses of the other of said third and fourth storage means to store further processed image data therein.

4. An apparatus according to claim 3, further comprising:
central control circuit means for producing internal control signals;
external controller means for receiving an external control signal to control said central control circuit means; and
internal controller means for receiving an internal control signal derived from said central control circuit means via said data bus line selecting means to supply said internal control signal outside said processor control section.

5. An apparatus according to claim 3, wherein said processing circuit means comprises:
first and second latch means for connecting to one of said inputs for temporarily storing two different filter coefficients;
third and fourth latch means connected to the same of said inputs as said first and second latch means for temporarily storing two adjacent image data supplied from one of said first, third and fourth storage means;
first multiplier means for multiplying one of said two adjacent image data stored in said third and fourth latch means by one of said two different filter coefficients stored in said first and second latch means to obtain first multiplied data;
second multiplier means for multiplying the other of said image data by the other of said two different filter coefficients to obtain second multiplied data;
first adder means for adding together said first multiplied data output from said first multiplier means and said second multiplied data output from said second multiplier means, which first and second multiplied data have to obtain an added image data;
fifth latch means coupled to the other of said inputs of said processing circuit means for temporarily storing said processed image data supplied from one of said third and fourth storage means; and
second adder means for adding said added image data supplied from said first adder means to said processed image data supplied from said fifth latch means to supply said further processed image data to said output.

6. A method of performing N×N digital filtering of a digital image data, wherein N is odd integer greater than or equal to three, said method comprising the steps of:
(a) reforming an N×N filtering coefficient matrix into an N×(N+1) filtering coefficient matrix by adding a column of zeros in the (N+1)th column of the N×N filtering coefficient matrix;
(b) storing said digital image data in first storage means;
(c) providing second and third storage means for storing processed image data;
(d) holding two different filter coefficients in first and second latch means;
(e) holding two adjacent image data in third and fourth latch means provided from one of said first, second and third storage means;
(f) multiplying sid one of said adjacent image data by one of said two different filter coefficients to obtain a first multiplied data and the other of said adjacent image data by the other of said filter coefficients to obtain a second multiplied data;

(g) adding said first multiplied data and said second multiplied data to produce added image data;

(h) adding said added image data to processed image data which was previously processed before and stored in one of second and third storage means, to produce further processed image data;

(i) storing said further processed image data in the other of said second and third storage means;

(j) repeating said steps (e)–(i) for said image data; and (k) repeating said steps (d)–(k) for said $N\times(N+1)$ filtering coefficients.

* * * * *